United States Patent
Yassa

(10) Patent No.: US 10,747,963 B2
(45) Date of Patent: *Aug. 18, 2020

(54) SPEECH MORPHING COMMUNICATION SYSTEM

(75) Inventor: Fathy Yassa, Soquel, CA (US)

(73) Assignee: SPEECH MORPHING SYSTEMS, INC., San Jose, CA (US)

( * ) Notice: Subject to any disclaimer, the term of this patent is extended or adjusted under 35 U.S.C. 154(b) by 392 days.

This patent is subject to a terminal disclaimer.

(21) Appl. No.: 13/284,971

(22) Filed: Oct. 30, 2011

(65) Prior Publication Data

US 2012/0109626 A1 May 3, 2012

Related U.S. Application Data

(60) Provisional application No. 61/408,634, filed on Oct. 31, 2010.

(51) Int. Cl.
| | |
|---|---|
| *G06F 17/28* | (2006.01) |
| *G06F 40/58* | (2020.01) |
| *G10L 13/00* | (2006.01) |
| *G10L 15/26* | (2006.01) |
| *G06F 40/51* | (2020.01) |

(52) U.S. Cl.
CPC .............. *G06F 40/58* (2020.01); *G06F 40/51* (2020.01); *G10L 13/00* (2013.01); *G10L 15/26* (2013.01)

(58) Field of Classification Search
CPC ....................................................... G06F 17/28
USPC ............ 704/2, 275, 251, 270, 260, 267, 258
See application file for complete search history.

(56) References Cited

U.S. PATENT DOCUMENTS

| | | | | |
|---|---|---|---|---|
| 5,426,583 A | * | 6/1995 | Uribe-Echebarria Diaz De Mendibil | G06F 40/268 704/2 |
| 5,577,165 A | * | 11/1996 | Takebayashi | G06F 3/16 704/251 |
| 5,642,466 A | * | 6/1997 | Narayan | G10L 13/10 704/200 |
| 5,715,368 A | * | 2/1998 | Saito | G10L 13/10 704/260 |
| 5,729,694 A | * | 3/1998 | Holzrichter | G06Q 20/204 704/270 |
| 5,864,812 A | * | 1/1999 | Kamai | G10L 13/02 704/268 |
| 6,092,039 A | * | 7/2000 | Zingher | G10L 19/00 704/203 |

(Continued)

*Primary Examiner* — Michael Colucci
(74) *Attorney, Agent, or Firm* — Sughrue Mion, PLLC

(57) ABSTRACT

A communication system is described. The communication system including an automatic speech recognizer configured to receive a speech signal and to convert the speech signal into a text sequence. The communication also including a speech analyzer configured to receive the speech signal. The speech analyzer configured to extract paralinguistic characteristics from the speech signal. The communication system further includes a translator coupled with the automatic speech recognizer. The translator configured to convert the text sequence from a first language to a second language. In addition, the communication system includes a speech output device coupled with the automatic speech recognizer and the speech analyzer. The speech output device configured to convert the text sequence into an output speech signal based on the extracted paralinguistic characteristics.

19 Claims, 13 Drawing Sheets

(56) References Cited

U.S. PATENT DOCUMENTS

| | | | | |
|---|---|---|---|---|
| 6,101,470 A * | 8/2000 | Eide | G10L 13/10 | 704/260 |
| 6,151,571 A * | 11/2000 | Pertrushin | G10L 17/26 | 704/207 |
| 6,173,262 B1 * | 1/2001 | Hirschberg | G10L 13/04 | 704/260 |
| 6,175,819 B1 * | 1/2001 | Van Alstine | G10L 13/00 | 704/235 |
| 6,223,150 B1 * | 4/2001 | Duan | G10L 15/26 | 704/277 |
| 6,374,224 B1 * | 4/2002 | Horiguchi | G10L 13/00 | 704/266 |
| 7,136,811 B2 * | 11/2006 | Tirpak | G10L 19/0018 | 704/221 |
| 7,155,390 B2 * | 12/2006 | Fukada | G10L 13/10 | 704/254 |
| 7,228,275 B1 * | 6/2007 | Endo | G10L 15/32 | 704/231 |
| 7,315,820 B1 * | 1/2008 | Munns | G09B 5/00 | 704/260 |
| 7,349,847 B2 * | 3/2008 | Hirose | G10L 13/033 | 704/258 |
| 7,593,849 B2 * | 9/2009 | Das | G10L 15/07 | 704/224 |
| 7,664,629 B2 * | 2/2010 | Dymetman | G06F 40/253 | 704/4 |
| 7,877,251 B2 * | 1/2011 | Kunnaran | G06F 40/40 | 704/2 |
| 7,996,222 B2 * | 8/2011 | Nurminen | G10L 21/00 | 704/200.1 |
| 8,032,356 B2 * | 10/2011 | Narayanan | G06F 40/44 | 704/2 |
| 8,103,505 B1 * | 1/2012 | Silverman | G10L 13/033 | 704/258 |
| 8,108,509 B2 * | 1/2012 | Chatani | A63F 13/12 | 709/224 |
| 8,175,879 B2 * | 5/2012 | Nitisaroj | G10L 15/1807 | 704/251 |
| 8,204,739 B2 * | 6/2012 | Waibel | G10L 15/1815 | 704/10 |
| 8,332,212 B2 * | 12/2012 | Wittenstein | G10L 15/26 | 704/211 |
| 2002/0032565 A1 * | 3/2002 | Rose | G10L 15/065 | 704/240 |
| 2002/0049594 A1 * | 4/2002 | Moore | G10L 13/04 | 704/258 |
| 2002/0161580 A1 * | 10/2002 | Taylor | G10L 15/065 | 704/235 |
| 2004/0192384 A1 * | 9/2004 | Anastasakos | G10L 15/30 | 455/557 |
| 2005/0071163 A1 * | 3/2005 | Aaron | G10L 13/10 | 704/260 |
| 2005/0273339 A1 * | 12/2005 | Chaudhari | G10L 15/26 | 704/270 |
| 2006/0136193 A1 * | 6/2006 | Lux-Pogodalla | G06F 40/47 | 704/2 |
| 2007/0055527 A1 * | 3/2007 | Jeong | G10L 13/033 | 704/260 |
| 2007/0174049 A1 * | 7/2007 | Oh | G10L 25/90 | 704/207 |
| 2007/0208569 A1 * | 9/2007 | Subramanian | G10L 19/0018 | 704/270 |
| 2008/0109228 A1 * | 5/2008 | Park | G10L 15/18 | 704/277 |
| 2008/0177528 A1 * | 7/2008 | Drewes | G06F 40/58 | 704/2 |
| 2008/0208565 A1 * | 8/2008 | Bisegna | G06F 40/40 | 704/4 |
| 2009/0055158 A1 * | 2/2009 | Xu | G10L 15/26 | 704/2 |
| 2010/0114556 A1 * | 5/2010 | Meng | G10L 13/033 | 704/2 |
| 2010/0312565 A1 * | 12/2010 | Wang | G10L 13/033 | 704/260 |

* cited by examiner

SPEECH MORPHING COMMUNICATION SYSTEM

CROSS-REFERENCE TO RELATED APPLICATIONS

This application claims priority to U.S. Provisional Patent Application No. 61/408,634, filed on Oct. 31, 2010, which is incorporated herein by reference in its entirety.

FIELD

Embodiments of the invention relate to communication systems. In particular, embodiments of the invention relate to a communication system to extract paralinguistic characteristics from speech.

BACKGROUND

Current communication systems can be used to convert speech into text. Such a system receives speech and converts the received speech into text. However, the current communication systems do not extract the original paralinguistic characteristics from the speech. As such, such a communication system is not capable of converting the text back into speech based on the original paralinguistic characteristics.

Paralinguistic characteristics of speech aid in the comprehension of the meaning of the original speech. The loss of the paralinguistic characteristics of the original speech creates ambiguity in the output speech and creates the potential for miscommunication between parties. Thus, speech that was originally intended to be jovial might seem harsh when converted into text without the inclusion of additional text to ensure the proper context of the original speech is maintained.

SUMMARY

A communication system is described. The communication system including an automatic speech recognizer configured to receive a speech signal and to convert the speech signal into a text sequence. The communication also including a speech analyzer configured to receive the speech signal. The speech analyzer configured to extract paralinguistic characteristics from the speech signal. The communication system further includes a translator coupled with the automatic speech recognizer. The translator configured to convert the text sequence from a first language to a second language. In addition, the communication system includes a speech output device coupled with the automatic speech recognizer and the speech analyzer. The speech output device configured to convert the text sequence into an output speech signal based on the extracted paralinguistic characteristics.

Other features and advantages of embodiments of the present invention will be apparent from the accompanying drawings and from the detailed description that follows.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

Embodiments of a speech morphing communication system are described. In particular, a speech morphing communication system is described that converts speech into text and extracts paralinguistic characteristics. Paralinguistic characteristics include, but are not limited to, pitch, amplitude, rate of speech, speaking style and other components of speech. Embodiments of the speech morphing communication system then use the paralinguistic characteristics and the converted text to generate output speech. This output speech would include paralinguistic characteristics based on the original speech. Such a speech to text system provides the advantage of preserving speech characteristics to render an accurate and meaningful recreation of the input speech.

Some embodiments of the speech morphing communication system translate the converted text from a first language or dialect into a second language or dialect generating a translated text sequence based on the converted text. The system then uses the translated text sequence and the extracted paralinguistic characteristics to form output speech including paralinguistic characteristics. Because the system generates output speech based on the extracted paralinguistic characteristics the system renders a more accurate and more meaningful translation of the original speech over systems that do not render output speech based on paralinguistic characteristics. For example, the paralinguistic characteristics that make a question sound like a question will be preserved so the output speech will still sound like a question.

Figure 1:
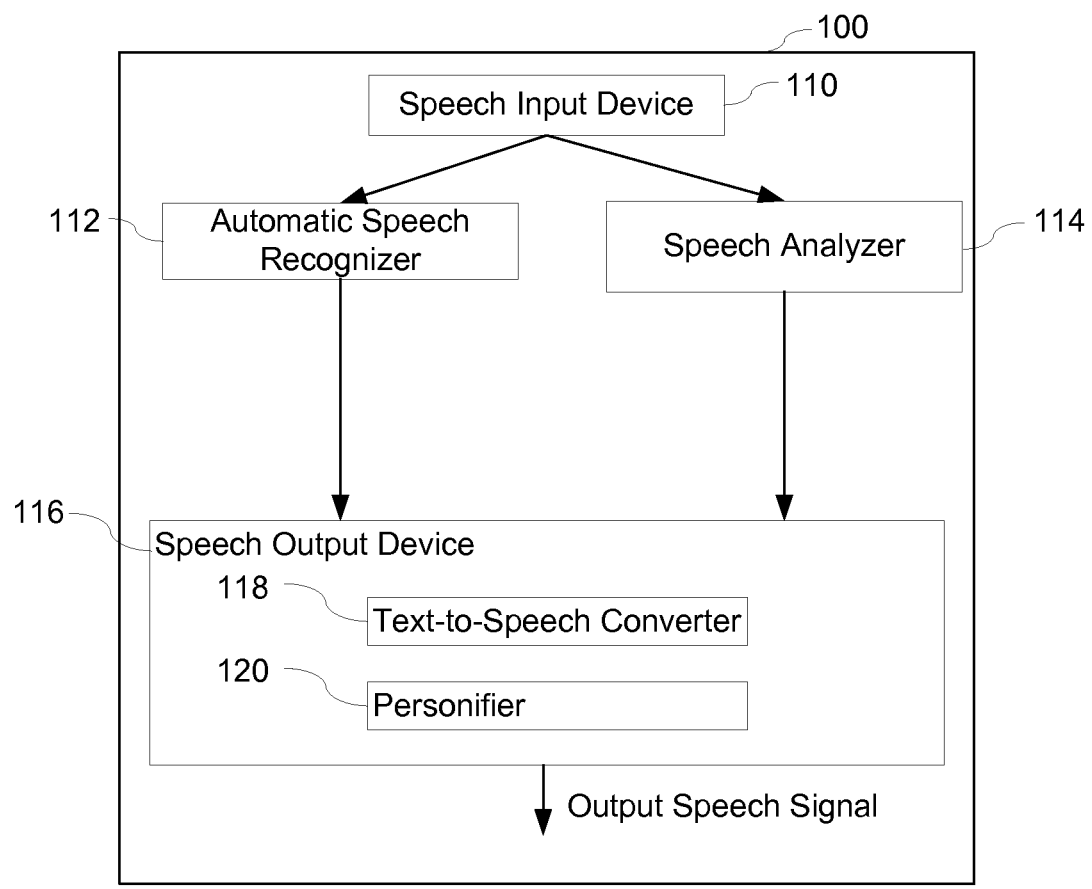
FIG. 1 illustrates a block diagram of an embodiment of a speech morphing communication system.

FIG. 1 illustrates a block diagram according to an embodiment of a speech morphing communication system 100. The speech morphing communication system 100 may be implemented as a stand-alone system or be incorporated into another system or device. The speech morphing communication system 100 includes a speech input device 110. Speech input device 110 includes, but is not limited to, a microphone, an analog to digital converter, or an interface to receive data or signals that correspond to speech. For an embodiment, speech input device 110 converts the received speech signal into a form for further processing by system 100. For example, speech input device 110 may convert a received input signal into another format. For some embodiments speech input device 110 is configured to convert the speech signal into the frequency domain using techniques know in the art, including, but not limited to, a Fourier transform. According to an embodiment, speech input device 110 may be an interface that passively (i.e. without processing or conversion) receives input speech signals and passes the input speech signals on for processing. Yet another embodiment includes a speech input device 110 implemented as a microphone which converts audio waves into electrical signals for further processing.

For the embodiment illustrated in FIG. 1, the speech input device 110 is coupled with an automatic speech recognizer 112. According to an embodiment, the automatic speech recognizer 112 converts the speech signal into text. For example, the automatic speech recognizer 112 may include one or more algorithms to analyze the input speech signal and to convert the input speech signal into a textual representation. Embodiments include automatic speech recognizers 112 based on hidden Markov models or dynamic time warping as is known in the art. For an embodiment using hidden Markov models, each word or phoneme will have a different output distribution. As such, analysis of the output distribution will generate the textual representation of the input speech signal. Other embodiments may include automatic speech recognizers 112 based on other techniques or statistical models. As such, embodiments of the automatic speech recognizers 112 use statistical distributions to determine the sequence of words or phonemes that make the input speech signal to create a textual representation.

The textual representation or text sequence may be one or more bits that represent one or more letters. For an embodiment the input speech signal is converted to a series of bytes (8 bits) where each byte represents a letter included in the input speech signal.

According to an embodiment the speech input device 110 is also coupled with a speech analyzer 114. The speech analyzer 114 extracts paralinguistic characteristic from the input speech signal. According to embodiments, the speech analyzer 114 uses signal processing techniques as known in the art. For some embodiments, the speech analyzer 114 performs frequency domain analyses of the input speech signal to extract the paralinguistic characteristics of the input speech signal. For an embodiment the input speech signal is converted into the frequency domain using a Fourier transform. Such embodiments then preform signal analysis in the frequency domain to extract one or more paralinguistic characteristics. Some embodiments use cepstrum domain analysis to determine paralinguistic characteristics of the input speech signal. The cepstrum provides information about the rate of change of the different spectrum bands that is used for determining paralinguistic characteristics, such as pitch. Other embodiments use one or more signal analysis techniques to extract the paralinguistic characteristics of an input speech signal.

According to an embodiment the speech analyzer 114 extracts dynamic characteristics from the input speech signal. Dynamic characteristic of an input speech signal include, but are not limited to, instantaneous pitch, pitch standard deviation, and pitch means. The speech analyzer 114 may also extract static characteristics of an input speech signal. Examples of static characteristics of an input speech signal include, but are not limited to, characteristics that indicate gender. The paralinguistic characteristics of an input signal give the other party an indication of the context of the speech. For example, it is the paralinguistic characteristics that give the speaker traits unique to that speaker that would indicate anger, surprise, happiness, and other emotions. In addition, the paralinguistic characteristics make laughter and a sneeze unique to a particular speaker. The speech morphing communication system 100, according to the embodiment illustrated in FIG. 1, may also include a speech output device 116.

According to the FIG. 1 embodiment the speech output device 116 is coupled with the automatic speech recognizer 112 and the speech analyzer 114. The speech output device 116 receives the text sequence from the automatic speech recognizer 112 and the extracted paralinguistic characteristics from the speech analyzer 114. For the embodiment illustrated in FIG. 1, the speech output device 116 includes a text-to-speech converter 118 to convert the text sequence into speech. According to an embodiment the text-to-speech converter 118 uses a text-to-speech algorithm to convert the text sequence into speech. The text-to-speech module 118 analyzes the text sequence to determine the corresponding speech to assign to one or more parts of the text sequence using text-to-speech techniques known in the art. The text-to-speech converter 118, for example, may assign a prerecorded voice representative of each word in the text sequence to create a speech signal based on the text sequence. According to some embodiments, the text-to-speech converter 118 includes a library of phonemes and generates a speech signal by selecting one or more of the phonemes that correspond to each letter in the text sequence to form a sequence of phonemes.

In the embodiment illustrated in FIG. 1, the speech output device 116 also includes a personifier 120. The personifier 120 receives the paralinguistic characteristics from the speech analyzer 114. These paralinguistic characteristics are then used to transform the speech signal created with the prerecorded voice or stock voice into an output speech signal with paralinguistic characteristics based on the original input speech. For embodiments, the extracted paralinguistic characteristics are used to modify the prerecorded voice using signal analysis techniques as known in the art. For some embodiments, techniques include using signal processing techniques in the frequency domain and/or the cestrum domain to transform the prerecorded voice based on the extracted paralinguistic characteristics.

Figure 2:
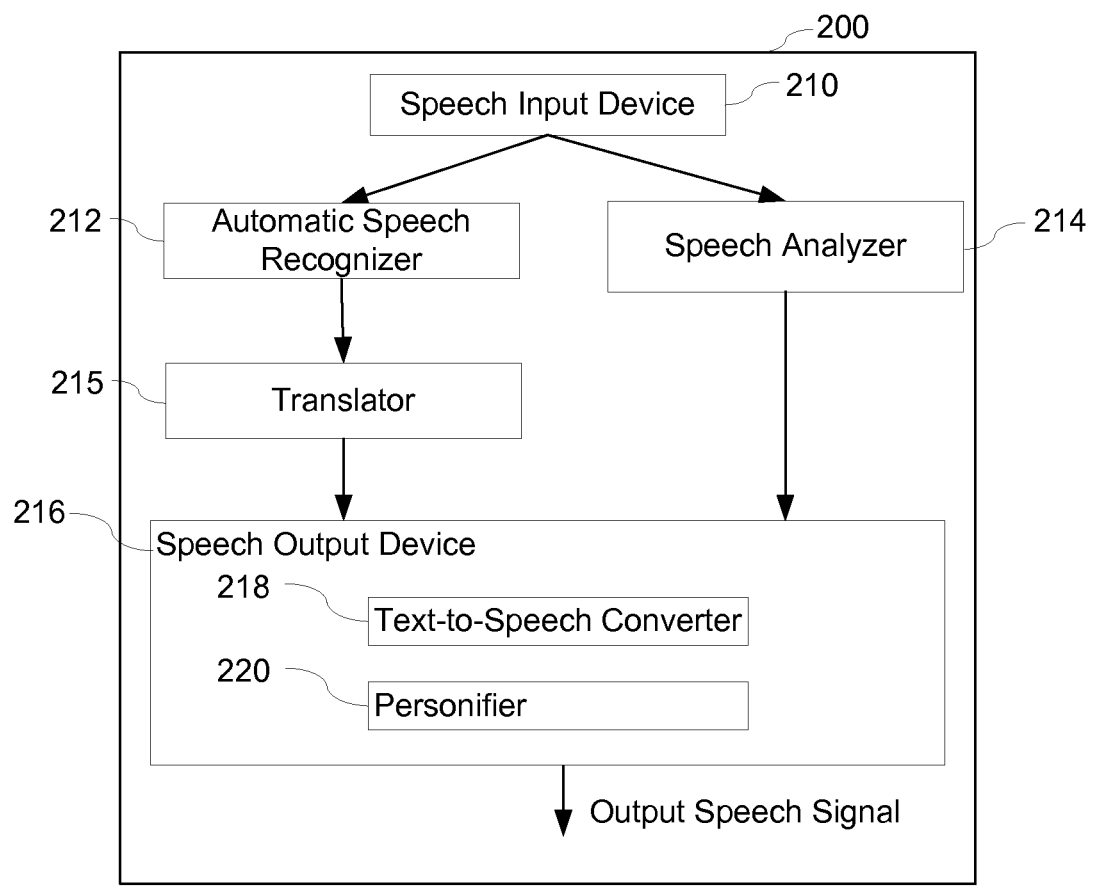
FIG. 2 illustrates a block diagram according to an embodiment of a speech morphing communication system that includes a translator.

FIG. 2 illustrates a block diagram according to an embodiment of a speech morphing communication system 200 that includes a translator 215. The FIG. 2 embodiment includes a speech input device 210, as discussed herein, coupled with an automatic speech recognizer 212. The automatic speech recognizer 212 is further coupled with a translator 215. As discussed herein, the automatic speech recognizer 212 transforms the speech signal received from the speech input device 210 into a text sequence. The translator then translates the text sequence from a first language into a second language. The translator 215 may use one or more translation algorithms or techniques, such as techniques based on statistical and/or rule-based modeling as is known in the art, for converting the text sequence from a first language into a second language. Examples of techniques used to translate a text sequence from a first language into a second language include, but are not limited to, rule-based machine translation, interlingual machine translation, dictionary-based machine translation, transfer-based machine translation, statistical machine translation, example-based machine translation, or hybrid machine translation or other technique based on computational linguistics. The translator, according to the embodiment illustrated in FIG. 2, is further coupled with the speech output device 216.

As illustrated in FIG. 2, the speech output device 216 includes a text-to-speech converter 218. The text-to-speech converter 218 transforms the translated text sequence received from the translator 215 into a speech signal, as discussed herein. Similar to the embodiment illustrated in FIG. 1, the speech output device 210 is also coupled with the speech analyzer 214. As discussed herein, the speech analyzer 214, which is coupled with the speech input device 210, extracts the paralinguistic characteristics of the input speech signal. These paralinguistic characteristics are transmitted to the speech output device 216. The speech output device 216, according to an embodiment, receives the translated text sequence from the translator 215 and transforms the translated text sequence into speech, as discussed herein. The speech output device 216 may also include a personifier 220. The personifier 220 uses the paralinguistic characteristics extracted by the speech analyzer to create paralinguistic characteristics for the translated text sequence. Since paralinguistic characteristics from a first language may impart a different connotation to a word in a second language, the personifier 220 in the FIG. 2 embodiment may do a transformation of paralinguistic characteristics extracted from the input speech signal into corresponding paralinguistic characteristics for the second language.

The personifier 220 uses the paralinguistic characteristics for the second language to transform the speech signal, as discussed herein. For an embodiment the personifier 220 may include a look-up table of paralinguistic characteristics for the second language. For example, such a look-up table may be stored in a memory. Paralinguistic characteristic for the second language may be stored in the memory in locations that correspond to a paralinguistic characteristic for the first language. As such, when the personifier 220 receives a paralinguistic characteristic of the first language the personifier 220 accesses the corresponding memory location for the appropriate paralinguistic characteristic in the second language. The personifier 220 then transforms the translated speech signal to include the paralinguistic characteristics accessed from the memory. As such, the speech output device 216 generates a translated speech output signal that includes paralinguistic characteristics based on the extracted paralinguistic characteristics from the speech input signal.

Figure 3:
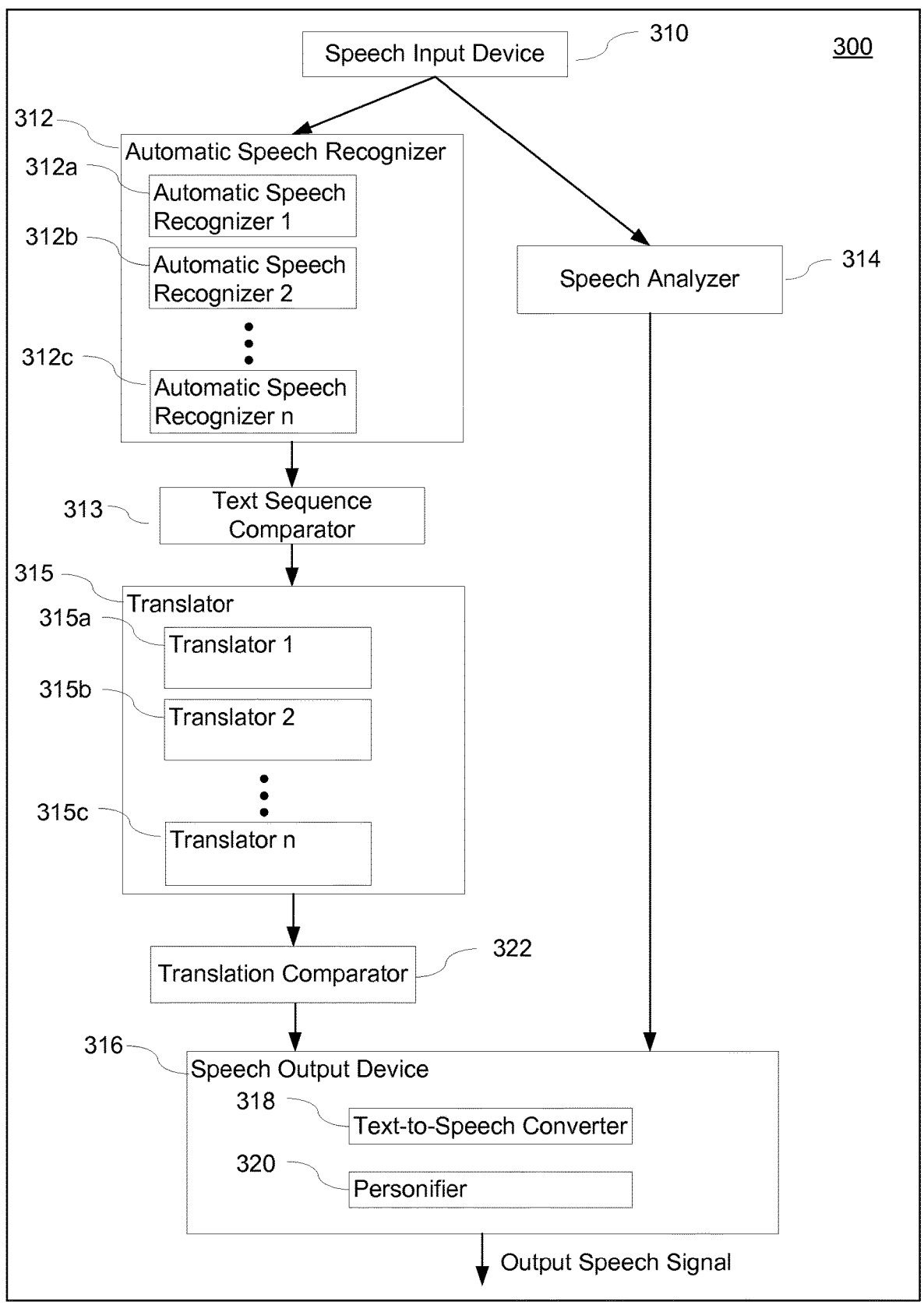
FIG. 3 illustrates a block diagram according to an embodiment of a speech morphing communication system that includes a plurality of automatic speech recognizers and a plurality of translators.

FIG. 3 illustrates a block diagram according to an embodiment of a speech morphing communication system 300 that includes a plurality of automatic speech recognizers and a plurality of translators. Speech morphing communication system 300 includes a speech input device 310. The speech input device 310 receives a speech input signal similar to that discussed herein. The speech input device 310 is coupled with automatic speech recognizer 312, which operates similar to the automatic speech recognizer discussed herein. In the embodiment illustrated in FIG. 3, the automatic speech recognizer 312 includes a plurality of automatic speech recognizer engines 312a-c. For an embodiment, each automatic speech recognizer engine 312a-c uses a different algorithm or technique to transform the speech signal into a text sequence. As such, a text sequence is generated by each of the automatic speech recognizer engines 312a-c.

The embodiment illustrated in FIG. 3 also includes a text sequence comparator 313 that is coupled to the automatic speech recognizer 312. For an embodiment, the text sequence comparator 313 analyzes the plurality of text sequences generated the plurality of automatic speech recognizer engines 312a-c. According to some embodiments, a text sequence comparator 313 generates a confidence score for each text sequence. Based on the confidence score a text sequence comparator 313 selects one of the text sequences. For example, the text sequence comparator 313 selects the text sequence with the highest determined confidence score. According to some embodiments, the confidence score is a statistical determination of the accuracy of the text sequence for example by calculating a confidence interval. For another embodiment, text sequence comparator 313 determines a likelihood of error for each of the plurality of text sequences using techniques as known in the art. For such an embodiment, the text sequence comparator 313 selects the text sequence with the lowest likelihood-of-error value. According to the embodiment, the speech morphing communication system 300 transmits or otherwise communicates the selected text sequence to the translator 315.

The translator 315, according to an embodiment, includes a plurality of translator engines 315a-c. For an embodiment, each translator engine 315a-c implements a different translation algorithm or technique to translate the selected text sequence received from the text sequence comparator 313. Translator 315 is also coupled with a translation comparator 322. The translation comparator 322 analyzes the plurality of text sequences generated by the translator engines 315a-c. According to some embodiments, a translation comparator 322 generates a confidence score for each of the plurality of translations. Based on the confidence score a translation comparator 322 selects one of the translations. For example the translation comparator 322 selects the text sequence with the highest determined confidence score. According to some embodiments, the confidence score is a statistical determination of the accuracy of the text sequence for example by calculating a confidence interval. For another embodiment, translation comparator 322 determines a likelihood of error for each of the plurality of translations using techniques as known in the art. For such an embodiment, the translator comparator 322 selects the translation with the lowest likelihood-of-error value.

The translation comparator 322 is also coupled with speech output device 316 which receives the selected translation form the translation comparator 322. The speech output device 316 of the embodiment illustrated in FIG. 3 includes a text-to-speech converter 318 and a personifier 320 that operates as described herein to generate an output speech signal including paralinguistic characteristics of the input speech signal.

Figure 4:
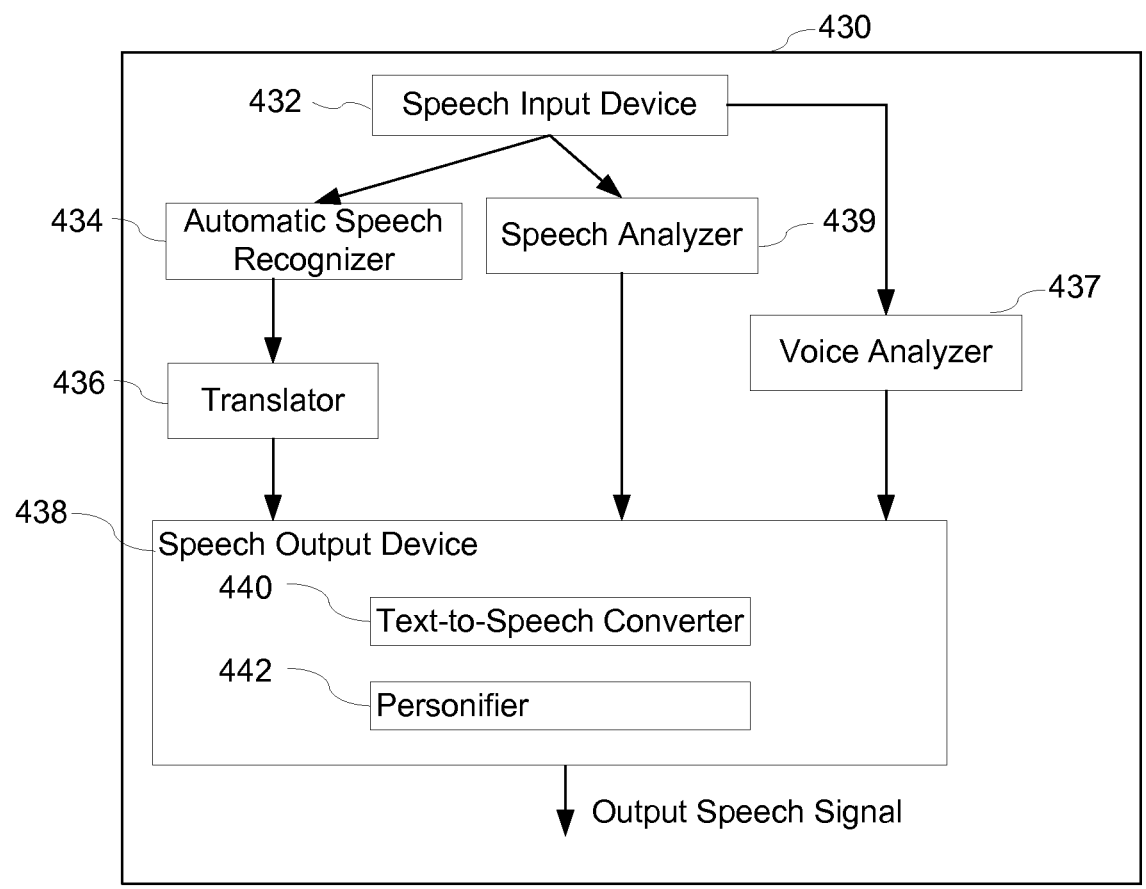
FIG. 4 illustrates a block diagram according to an embodiment of a speech morphing communication system to output a translated output speech signal in a similar voice as the input speech signal.

FIG. 4 illustrates an embodiment of a speech morphing communication system 430 configured to generate a translated output speech signal in a voice similar to the original speaker. According to an embodiment speech morphing communication system 430 includes a speech input device 432 that operates according to embodiments described herein. Speech input device 432 is coupled with an automatic speech recognizer 434 and speech analyzer 439. According to some embodiments the automatic speech recognizer 434 and speech analyzer 439 operate as other embodiments described herein. The automatic speech recognizer 434 and speech analyzer 439 are each coupled with speech output device 438, according to the embodiment illustrated in FIG. 4. The speech output device 438 receives a text sequence from automatic speech recognizer 434, as described herein. In addition, the speech output device 438 receives extracted paralinguistic characteristics from the speech analyzer 439, as described herein.

According to the embodiment illustrated in FIG. 4, the speech morphing communication system 430 further includes speech input device 432 coupled with a voice analyzer 437. The voice analyzer 437 receives the input speech signal and generates phonemes based on the input speech signal. For some embodiments, the voice analyzer 437 determines phonemes based on the input speech signal using hidden Markov models. As such, analysis of the output distribution is used to generate a plurality of phonemes based on the input speech signal. Other embodiments may include automatic speech recognizers 434 based on other techniques or statistical models. As such, embodiments of the automatic speech recognizers 434 use statistical distributions to determine phonemes based on the input speech signal. For some embodiments, speech morphing communication system 430 may not include a voice analyzer 437 because the speech analyzer 439 may generate the phonemes based on the input speech signal.

The speech output device 438, according to an embodiment, includes a text-to-speech converter 440 and a personifier 442. The text-to-speech converter 440 receives the translated text sequence, and a plurality of phonemes from voice analyzer 437. Text-to-speech converter 438 transforms the translated text sequence into speech using the plurality of phonemes based on the input speech signal using techniques to generate speech from text as describe herein. According to an embodiment, personifier 442 receives the extracted paralinguistic characteristics from speech analyzer 439 and transforms the extracted paralinguistic characteristics into corresponding paralinguistic characteristics for the destination language or second language using techniques similar to other embodiments described herein.

The personifier 442 then uses the paralinguistic characteristics for the destination language to generate a translated speech signal that includes the transformed paralinguistic characteristics. As such, the speech output device 438 generates a translated speech output signal that includes paralinguistic characteristics based on the extracted paralinguistic characteristics from the speech input signal in a similar voice as the original speaker of the input speech signal.

Figure 5:
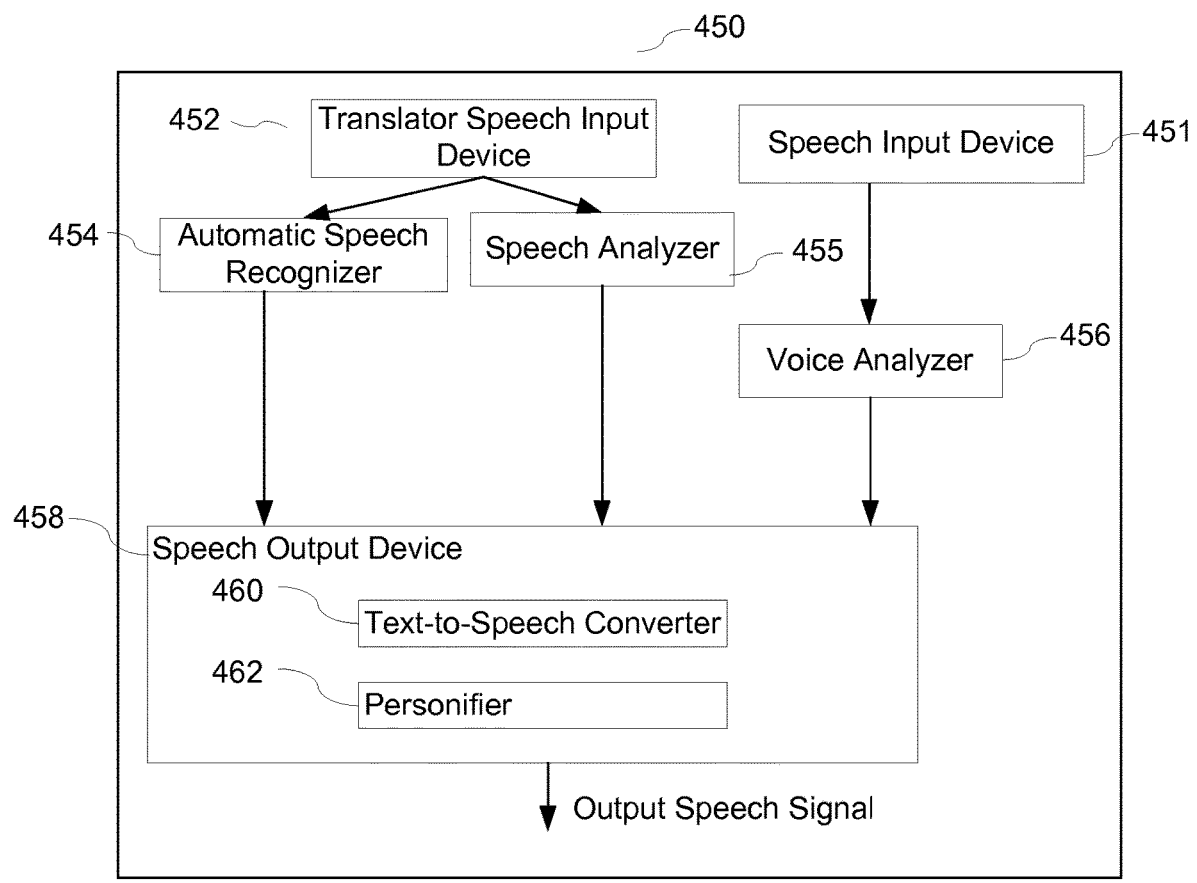
FIG. 5 illustrates a block diagram according to an embodiment of a speech morphing communication system to use a translator speech signal to generate a translated output speech signal in a similar voice as the input speech signal.

FIG. 5 illustrates a speech morphing communication system 450 that receives an input speech signal in a first language and a translator input speech signal in a second language. The speech morphing communication system 450 uses the translator input speech signal to transform the input speech signal to generate an output speech signal in the second language with voice characteristics similar to the original speaker of the input speech signal. According to the embodiment illustrated in FIG. 5, the speech morphing communication system 450 includes a speech input device 451 and a translator speech input device 452. According to an embodiment the translator speech input signal is a human translation corresponding to the speech input signal.

The speech input device 451 is configured to receive an input speech signal of a first speaker that is in a first language. The translator speech input device 452 is configured to receive a translator speech signal from a human translator that interprets the input speech signal of the first speaker into a second language. For some embodiments, the translator speech input device 452 includes, but is not limited to, a microphone, an analog to digital converter, or an interface to receive data or signals that correspond to speech.

For an embodiment, translator speech input device 452 converts the received translator speech signal into a form for further processing by system 450. For example, translator speech input device 452 may convert a received input signal into another format. For some embodiments translator speech input device 452 is configured to convert the translator speech signal into the frequency domain using techniques know in the art, including, but not limited to, a Fourier transform. According to an embodiment, translator speech input device 452 may be an interface that passively receives input speech signals and passes the input speech signals on for processing. Yet another embodiment includes a translator speech input device 452 implemented as a microphone which converts audio waves into electrical signals for further processing. For some embodiments, the translator speech input device 452 and the speech input device 451 are one module configured to receive both a translator speech signal and an input speech signal.

Referring to the embodiment in FIG. 5, the translator speech input device 452 is coupled with an automatic speech recognizer 454 and a speech analyzer 455. Similar to other embodiments described herein, the automatic speech recognizer 454 transforms the translator speech signal received from the translator speech input device 452 into a text sequence using techniques described herein. The automatic speech recognizer 454 is further coupled with a speech output device 458.

The speech analyzer 455 according to the embodiment illustrated in FIG. 5 is coupled with speech output device 458. The speech analyzer 455, according to an embodiment, extracts paralinguistic characteristics from the translator speech signal using techniques describe herein. The speech output device receives the extracted paralinguistic characteristics. For some embodiments, the speech output device 458 includes a text-to-speech converter 460 and a personifier 462. According to an embodiment, the speech output device 458 receives the extracted paralinguistic characteristics.

The embodiment illustrated in FIG. 5 also includes a voice analyzer 456 coupled with speech input device 451. As such, the voice analyzer 456 receives a speech input signal from speech input device 451. According to an embodiment, the voice analyzer 456 generates a plurality of phonemes based on the speech input signal using techniques described herein. The voice analyzer 456 is further coupled with speech output device 458 according to an embodiment.

For an embodiment, the speech output device 458 receives the plurality of phonemes based on the speech input signal. As discussed, the speech output device 458 includes a text-to-speech converter 460. The speech output device 458, according to an embodiment, includes a text-to-speech converter 460 and a personifier 462. The text-to-speech converter 460 receives the text sequence from the automatic speech recognizer 454 and a plurality of phonemes from voice analyzer 456. Text-to-speech converter 458 transforms the translated text into speech using the plurality of phonemes based on the input speech signal.

According to an embodiment, personifier 462 receives the extracted paralinguistic characteristics from speech analyzer 455. The personifier 462 uses the paralinguistic characteristics from the translator speech signal to generate a translated speech signal that includes the paralinguistic characteristics of the translator speech signal and the voice that corresponds to the speech input signal. As such, the speech output device 458 generates a translated output speech signal that includes paralinguistic characteristics based on the extracted paralinguistic characteristics from the translator speech signal in a similar voice as the original speaker of the input speech signal.

Figure 6:
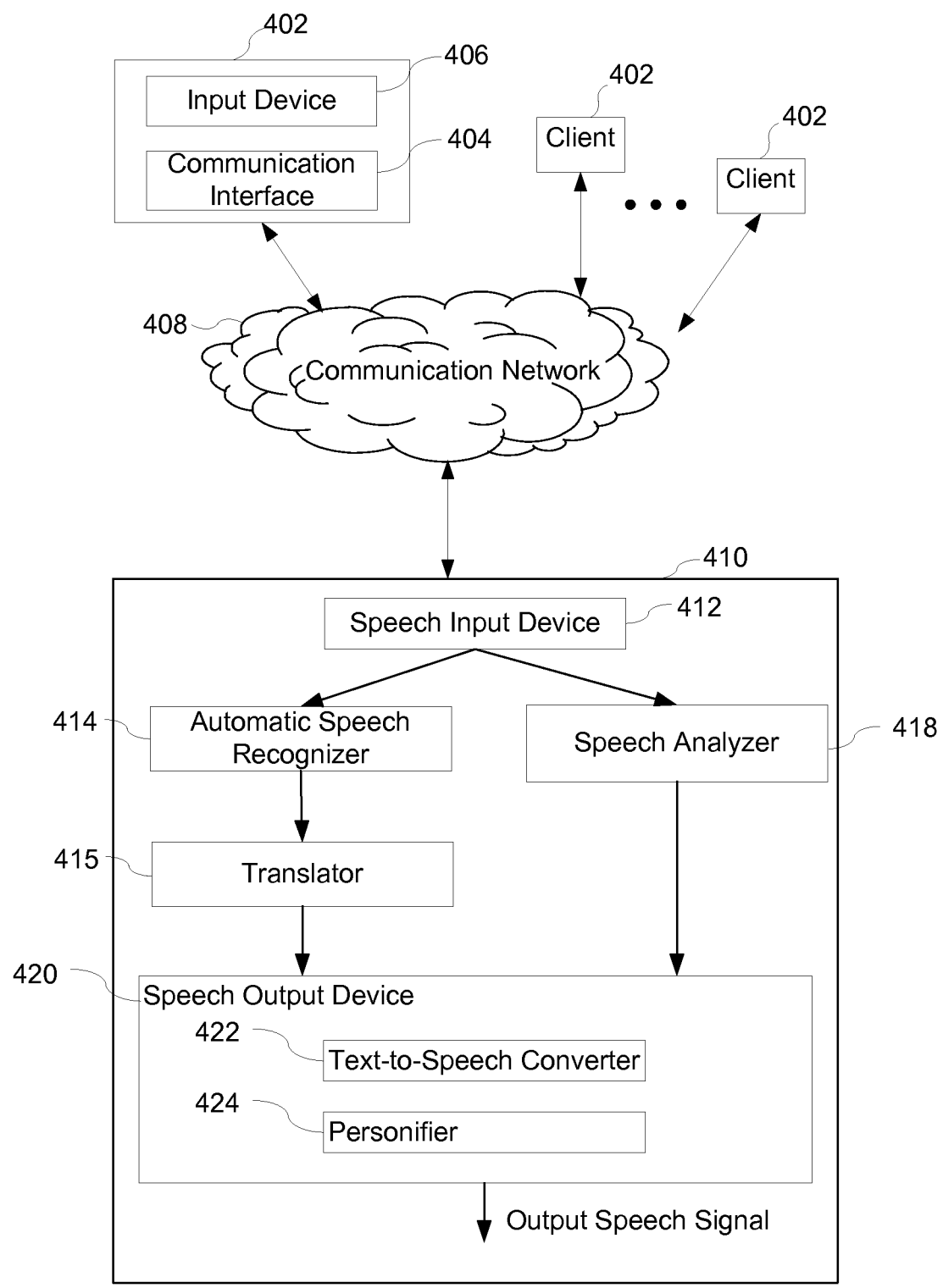
FIG. 6 illustrates a block diagram according to an embodiment of a speech morphing communication system implemented in a communication network.

Embodiments of a speech morphing communication system may be implemented in a communication network. Such a networked speech morphing communication system may receive a speech input signal from a client device over a communication network. FIG. 6 illustrates a block diagram according to an embodiment of a networked speech morphing communication system 400. As illustrated in FIG. 6, such a network may include one or more clients 402. The client 402 may include phones, smartphones, personal digital assistances (PDAs), computers, tablet computers, or any device capable of producing a speech signal. A client 402 may include an input device 406 to generate a speech signal such as a microphone, an analog to digital converter, or an interface to receive data or signals that correspond to speech. According to an embodiment of a client 402, the client 402 also includes a communication interface 404 configured to communicate over communication network 408 to speech morphing communication system 410. Communication network 408 includes, but is not limited to, the Internet, other wide area networks, local area networks, metropolitan area networks, wireless networks, or other networks used for communicating between devices or systems.

According to the embodiment illustrated in FIG. 6, the speech morphing communication system 410 includes a speech input device 412. For such an embodiment, the speech input device 412 may be a communication interface configured to receive speech signals from one or more clients 402. According to some embodiments, speech input device 412 converts the received speech signal into a form to be processed by automatic speech recognizer 414 and speech analyzer 418. For example, speech input device 412 may receive a speech signal included in a packet used for communication between devices through communication network 408, such as an Ethernet packet or other communication format. Speech input device 412 would extract the speech signal from the packet.

The speech input device 412 is coupled with an automatic speech recognizer 414. The automatic speech recognizer 414, according to an embodiment, would transform or convert the speech signal using one of more algorithms or techniques as discussed herein. Further, the automatic speech recognizer 414 may also include a plurality of automatic speech recognizers as discussed herein. For embodiments including a plurality of automatic speech recognizers, the automatic speech recognizer 414 may include a text sequence comparator as discussed herein.

The speech input device 412 is also coupled with speech analyzer 418. According to an embodiment, the speech analyzer 418 extracts the paralinguistic characteristics as discussed herein. According to the embodiment illustrated in FIG. 4, the speech analyzer 418 is coupled with the speech output device 420. The embodiment also includes a translator 415 coupled with the automatic speech recognizer 412 and the speech output device 416. Similar to that discussed herein, the translator 415 receives the selected text sequence and translates the text sequence from a first language to one or more languages using techniques discussed herein. The translator 415 according to an embodiment may include a plurality of translator engines and a translator comparator as discussed herein.

The speech output device 420 according to the embodiment receives the translated text sequence. The speech output device 420 includes a text-to-speech converter 422 and personifier 424. The text-to-speech converter generates speech corresponding to the translated text sequence as discussed herein. Similar to embodiments discussed herein, the personifier 424 uses the extracted paralinguistic characteristics to generate corresponding paralinguistic characteristics for the destination language of the translated speech using techniques described herein. According to an embodiment, the output device 420 communicates the output speech signal through the communication network 408 to the originating client 402 or to another client 402. For some embodiments, the speech morphing communication system 410 may transmit the output speech signal to more than one client 402. A speech morphing communication system may be implemented using one or more computers, servers, devices, hardware, software, or any combination thereof.

Figure 7:
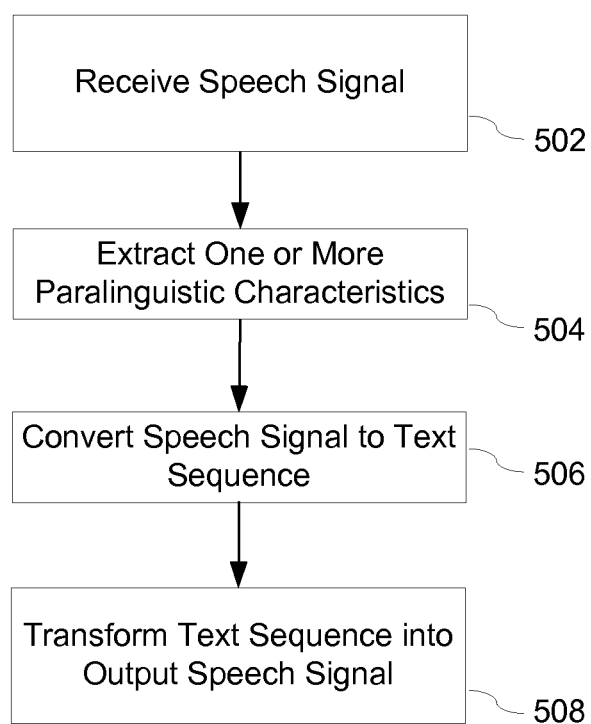
FIG. 7 illustrates a flow diagram of a process for converting a speech signal into a text sequence including extracting paralinguistic characteristics according to an embodiment.

FIG. 7 illustrates a flow diagram of a process for transforming a speech signal into a text sequence and extracting paralinguistic characteristics according to an embodiment. At block 502, a speech signal is received. The speech signal is received according to methods and techniques described herein. One or more paralinguistic characteristics of the speech signal are extracted at block 504. The paralinguistic characteristics are extracted from the speech signal according to techniques described herein. The process converts the speech signal to a text sequence at block 506. The conversion of the speech signal to a text sequence is done using methods and techniques described herein. At block 508, the process transforms the text sequence into an output speech signal, according to methods and techniques described herein.

Figure 8:
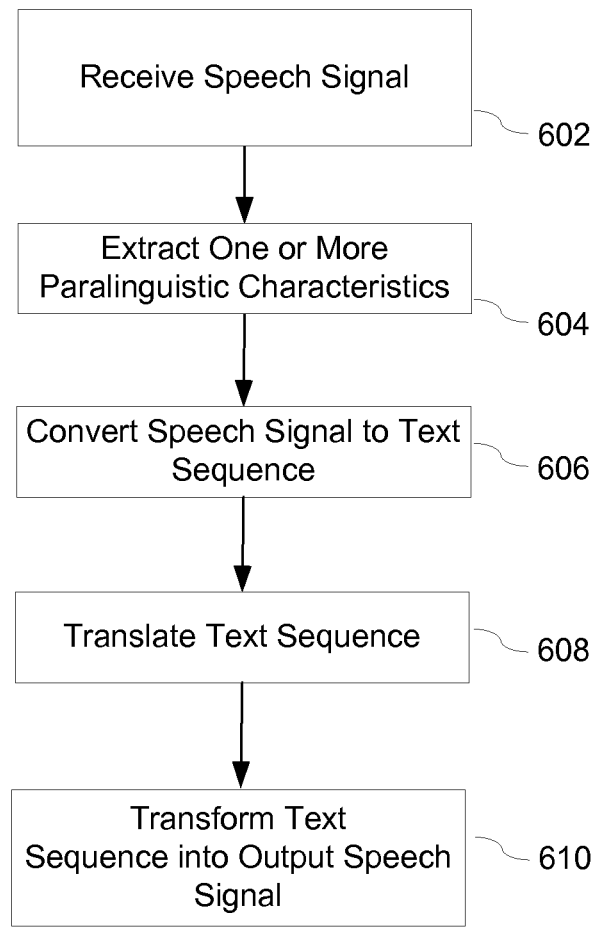
FIG. 8 illustrates a flow diagram of a process for converting a speech signal into a text sequence including extracting paralinguistic characteristics and translation of the text sequence according to an embodiment.

FIG. 8 illustrates a flow diagram of a process for converting a speech signal into a text sequence including extracting paralinguistic characteristics and translation of the text sequence according to an embodiment. The process includes receiving a speech signal in one or more formats at block 602 using techniques described herein. At block 604, one or more paralinguistic characteristics are extracted from the speech signal. The speech signal is also converted to a text sequence at block 606, according to techniques described herein. At block 608, the process translates the text sequence into one or more translations. The process also includes transforming the text sequence into an output speech signal based on one or more of the extracted paralinguistic characteristics at block 610.

Figure 9:
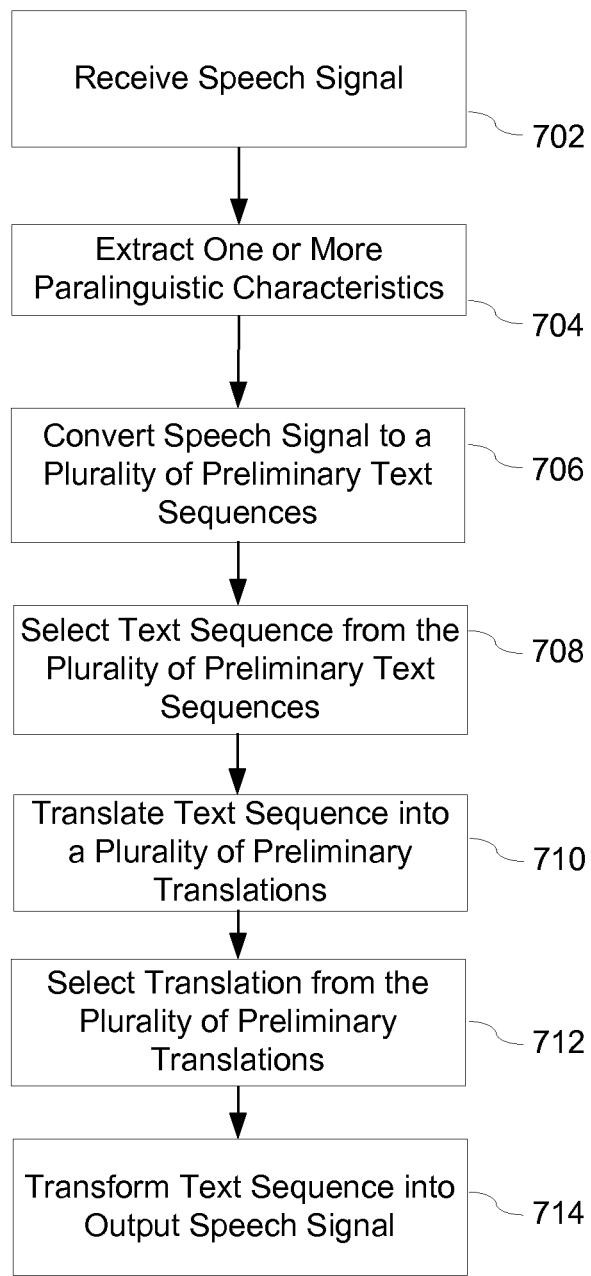
FIG. 9 illustrates a flow diagram of a process for converting a speech signal into a text sequence including extracting paralinguistic characteristics used to transform the text sequence back into a speech signal using a plurality of text sequences and/or a plurality of translations according to an embodiment.

FIG. 9 illustrates a flow diagram of a process for converting a speech signal into a text sequence including extracting paralinguistic characteristics used to transform the text sequence back into a speech signal using a plurality of text sequences and translations according to an embodiment. At block 702 in FIG. 9, the process receives a speech signal. One or more paralinguistic characteristic are extracted from the speech signal at block 704. The speech signal is converted to a plurality of preliminary text sequences at block 706, using to methods and techniques similar to those discussed herein. The process selects a text sequence from the plurality of preliminary text sequences at block 708. According to some embodiments the process selects the text sequence from the plurality of preliminary text sequences by determining the text sequence with the lowest error or highest confidence score, as discussed herein. At block 710, the selected text sequence is translated into a plurality of translations using techniques and methods described herein. The process selects a translation from the plurality of preliminary translations at block 712. According to some embodiments the process selects the translation from the plurality of preliminary translations based on the determining the translation with the lowest error as discussed herein. At block 714, the process transforms the selected text sequence into an output speech signal based on one or more extracted paralinguistic characteristics.

Figure 10:
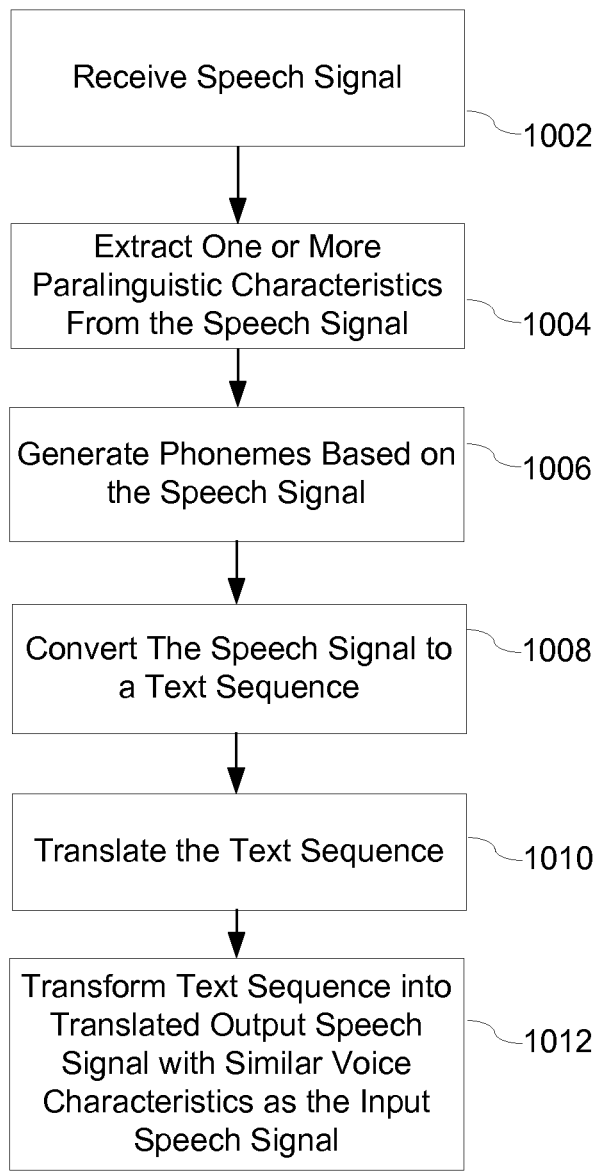
FIG. 10 illustrates a flow diagram of a process for converting a speech signal into a translated output speech signal with similar voice characteristics as the input speech signal according to an embodiment.

FIG. 10 illustrates a flow diagram of a process for converting a speech signal into a translated output speech signal with similar voice characteristics as the input speech signal according to an embodiment. According to the FIG. 10 embodiment, the process receives a speech signal in a first language originating from a speaker at block 1002. At block 1004, one or more paralinguistic characteristics are extracted from the speech signal using techniques described herein. Phonemes are generated based on the speech signal using techniques described herein at block 1006. According to the embodiment, at block 1008 the speech signal is converted into a text sequence using techniques described herein. The text sequence is translated into a second language at block 1010, according to techniques described herein. At block 1012, the translated text sequence is transformed into a translated output speech signal with similar voice characteristics as the originating speaker of the speech signal. According to some embodiment, the phonemes generated based on the input speech signal are used by a text-to-speech converter to generate speech from the translated text sequence as described herein. The extracted paralinguistic characteristics may then be used to generate paralinguistic characteristics for the second language. The generated paralinguistic characteristic used to further transform the speech into a translated output speech signal with similar voice characteristics as the input speech signal according to an embodiment.

Figure 11:
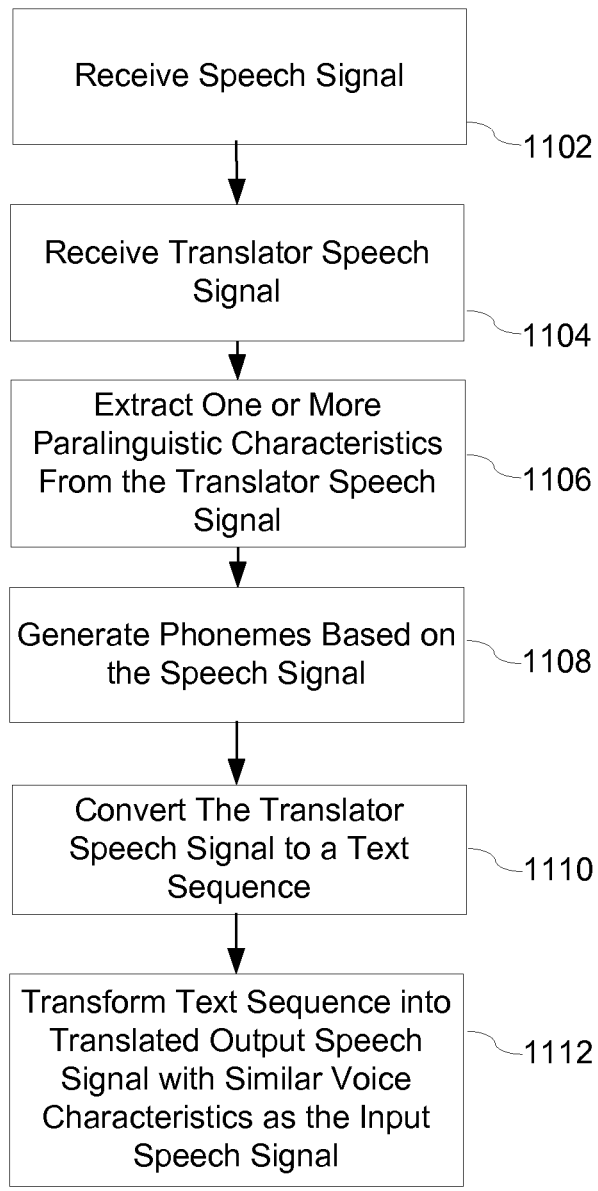
FIG. 11 illustrates a flow diagram of a process for converting a speech signal into a translated output speech signal with similar voice characteristics as the input speech signal using a translator speech signal according to an embodiment.

FIG. 11 illustrates a flow diagram of a process for converting a speech signal into a translated output speech signal with similar voice characteristics as the input speech signal using a translator speech signal according to an embodiment. According to the FIG. 11 embodiment a speech signal is received in a first language originating from a speaker at block 1102. At block 1104, a translator speech signal based on the speech signal is received in a second language from a human translator. One or more paralinguistic characteristics are extracted from the translator speech signal using techniques described herein at block 1106. Phonemes are generated based on the speech signal using techniques described herein at block 1108. According to the embodiment, at block 1110 the translator speech signal is converted into a text sequence using techniques described herein. The text sequence is transformed into a translated output speech signal with similar voice characteristics as the speech signal at block 1112, according to techniques described herein. According to some embodiment, the phonemes generated based on the speech signal are used by a text-to-speech converter to generate speech from the text sequence as described herein. The extracted paralinguistic characteristics may then be used to generate paralinguistic characteristics for the second language. The generated paralinguistic characteristic are used to further transform the speech into a translated output speech signal with similar voice characteristics as the input speech signal according to an embodiment.

Figure 12:
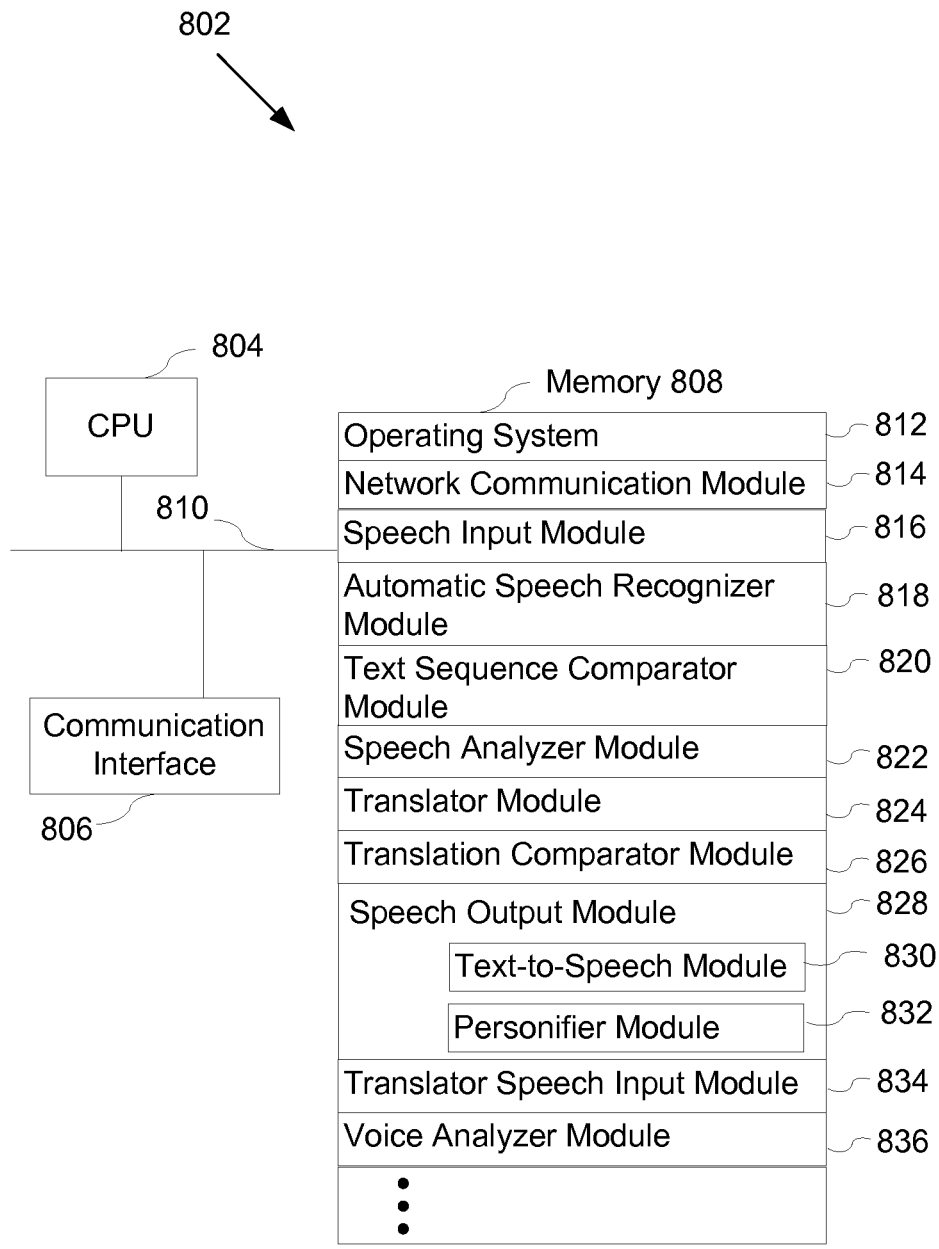
FIG. 12 illustrates a block diagram of a server according to an embodiment.

Referring to FIG. 12, an embodiment of a system 802 that implements the methods and techniques described herein includes one or more processing units (CPUs) 804, one or more network or other communications interfaces 806, a memory 808, and one or more communication buses 810 for interconnecting these components. The system 802 may optionally include a user interface comprising a display device and a keyboard (not shown). The memory 808 may include high speed random access memory and may also include non-volatile memory, such as one or more magnetic or optical storage disks. The memory 808 may include mass storage that is remotely located from CPUs 804. Moreover, memory 808, or alternatively one or more storage devices (e.g., one or more nonvolatile storage devices) within memory 808, includes a computer readable storage medium. The memory 808 may store the following elements, or a subset or superset of such elements:

an operating system 812 that includes procedures for handling various basic system services and for performing hardware dependent tasks;

a network communication module (or instructions) 814 that is used for connecting the system 802 to other computers, clients, systems or devices via the one or more communications interfaces 806 (wired or wireless), such as the Internet, other wide area networks, local area networks, metropolitan area networks, and other type of networks;

a speech input module 816 for receiving a speech signal as described herein;

an automatic speech recognizer module 818 for converting a speech signal into one or more a text sequences as described herein;

an text sequence comparator module 820 for selecting a text sequence from a plurality of preliminary text sequences as described herein;

a speech analyzer module 822 for extracting one or more paralinguistic characteristics from the speech signal as described herein;

a translator module 824 for translating a text sequence as described herein;

a translation comparator module 826 for selecting a translation from the plurality of preliminary translations as described herein;

a speech output module 828 for transforming text sequence into output speech signals as described herein;

a speech-to-text module 830 for converting a text sequence into speech as described herein and the speech-to-text converter module 830 may be included in a speech output module 828 or may be a separate module;

a personifier module 832 for creating an output speech signal with paralinguistic characteristics based on paralinguistic characteristics extracted from an input speech signal as described herein and the personifier module 832 may be included in a speech output module 828 or may be a separate module; and a translator speech input module 834 for receiving a translator speech input signal as described herein; and a voice analyzer module 836 for generating one or more phonemes as described herein.

Figure 13:
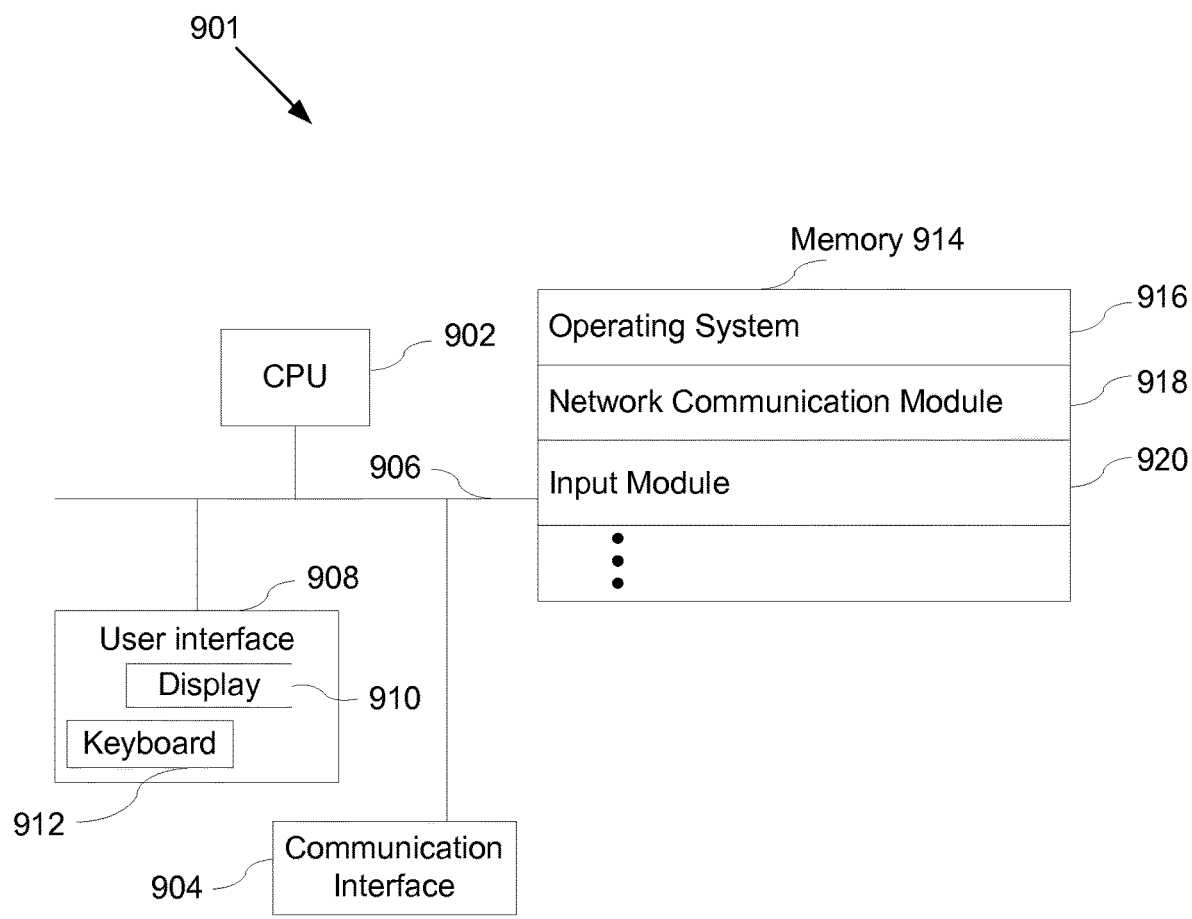
FIG. 13 illustrates a block diagram of a client according to an embodiment.

Referring to FIG. 13, an embodiment of a client 901 that implements the methods described herein includes one or more processing units (CPUs) 902, one or more network or other communications interfaces 904, memory 914, and one or more communication buses 906 for interconnecting these components. The client 102 may optionally include a user interface 908 comprising a display device 910 and/or a keyboard 912 or other input device. Memory 914 may include high speed random access memory and may also include non-volatile memory, such as one or more magnetic or optical storage disks. The memory 914 may include mass storage that is remotely located from CPUs 902. Moreover, memory 914, or alternatively one or more storage devices (e.g., one or more nonvolatile storage devices) within memory 914, includes a computer readable storage medium. The memory 906 may store the following elements, or a subset or superset of such elements:

an operating system 916 that includes procedures for handling various basic system services and for performing hardware dependent tasks;

a network communication module (or instructions) 918 that is used for connecting the client 901 to other computers, clients, systems or devices via the one or more communications network interfaces 904 and one or more communications networks, such as the Internet, other wide area networks, local area networks, metropolitan area networks, and other type of networks; and an input module 920 for producing a speech signal as described herein.

In the foregoing specification, specific exemplary embodiments of the invention have been described. It will, however, be evident that various modifications and changes may be made thereto. The specification and drawings are, accordingly, to be regarded in an illustrative rather than a restrictive sense.

What is claimed is:

1. A communication system comprising:
   an automatic speech recognizer configured to receive a speech signal of a speaker in a first language and to convert said speech signal into a text sequence in the first language;
   a speech analyzer configured to receive said speech signal, said speech analyzer configured to extract all paralinguistic characteristics of the speech signal in the first language from said speech signal;
   a translator coupled with said automatic speech recognizer, said translator configured to convert said text sequence from the first language to a second language; and
   a speech output device coupled with said automatic speech recognizer and said speech analyzer, said speech output device comprising a look-up table of paralinguistic characteristics mapping between the paralinguistic characteristics of the speech signal in the first language to paralinguistic characteristics of the speech signal in a second language, and said speech output device configured to transform all of the paralinguistic characteristics of the speech signal in the first language to the paralinguistic characteristics of the speech signal in the second language based on the mapping between the paralinguistic characteristics of the speech signal in the first language to the paralinguistic characteristics of the speech signal in the second language of the look-up table of paralinguistic characteristics and convert said translated text sequence in the second language into an output speech signal in the second language based on said paralinguistic characteristics of the speech signal in the second language,
   wherein the transformation of all the paralinguistic characteristics of the speech signal in the first language to the paralinguistic characteristics of the speech signal in the second language comprises transforming at least one paralinguistic characteristic of the speech signal in the first language imparting a connotation in the first language to a first word in the speech signal in the first language to at least one corresponding paralinguistic characteristic of the speech signal in the second language imparting the connotation in the second language to a second word of the speech signal in the second language, the second word in the second language being a translation of the first word in the first language,
   wherein said paralinguistic characteristics of the speech signal in the first language comprises at least one of a first pitch of the speech signal in the first language, a first amplitude of the speech signal in the first language, and a first rate of speech of the speech signal in the first language, and
   wherein said paralinguistic characteristics of the speech signal in the second language comprises at least one of a second pitch of the speech signal in the second language, a second amplitude of the speech signal in the second language, and a second rate of speech of the speech signal in the second language.

2. The communication system of claim 1, wherein said speech output device includes a personifier.

3. The communication system of claim 1, wherein said automatic speech recognizer converts said speech signal into said text sequence based on a first algorithm.

4. The communication system of claim 3, further comprising a second automatic speech recognizer, said second automatic speech recognizer configured to convert said speech signal to a second text sequence based on a second algorithm.

5. The communication system of claim 4, further comprising a text sequence comparator configured to compare said text sequence with said second text sequence.

6. The communication system of claim 5, wherein said text sequence comparator generates an error corrected text sequence based on the comparison of said text sequence and said second text sequence.

7. The communication system of claim 1, wherein said translator includes a plurality of translators.

8. The communication system of claim 1, wherein said output device converts said text sequence into the output speech signal using a text-to-speech algorithm.

9. A communication system comprising:
   a memory;
   one or more processors; and
   one or more modules stored in memory and configured for execution by the one or more processors, the one or more modules comprising:
   a speech input module configured to receive a speech signal of a speaker in a first language;
   an automatic speech recognizer module coupled with said speech input module, said automatic speech recognizer module configured to convert said speech signal into a text sequence in the first language;
   a speech analyzer module coupled with said speech input module, said speech analyzer module configured to extract all paralinguistic characteristics of the speech signal in the first language from said speech signal;
   a translator module coupled with said automatic speech recognizer module, said speech recognizer module configured to translate said text sequence from the first language to a second language; and
   an output speech module coupled with said translator module, said output speech module comprising a look-up table of paralinguistic characteristics mapping between the paralinguistic characteristics of the speech signal in the first language to paralinguistic characteristics of the speech signal in a second language, and said output speech module configured to transform all of the paralinguistic characteristics of the speech signal in the first language to the paralinguistic characteristics of the speech signal in the second language based on the mapping between the paralinguistic characteristics of the speech signal in the first language to the paralinguistic characteristics of the speech signal in the second language of the look-up table of paralinguistic characteristics and convert said translated text sequence in the second language into an output speech signal in the second language based on said paralinguistic characteristics of the speech signal in the second language, wherein the transformation of all the paralinguistic characteristics of the speech signal in the first language to the paralinguistic characteristics of the speech signal in the second language comprises transforming at least one paralinguistic characteristic of the speech signal in the first language imparting a connotation in the first language to a first word in the speech signal in the first language to at least one corresponding paralinguistic characteristic of the speech signal in the second language imparting the connotation in the second language to a second word of the speech signal in the second language, the second word in the second language being a translation of the first word in the first language, wherein said paralinguistic characteristics of the speech signal in the first language comprises at least one of a first pitch of the speech signal in the first language, a first amplitude of the speech signal in the first language, and a first rate of speech of the speech signal in the first language, and wherein said paralinguistic characteristics of the speech signal in the second language comprises at least one of a second pitch of the speech signal in the second language, a second amplitude of the speech signal in the second language, and a second rate of speech of the speech signal in the second language.

10. The communication system of claim 9, wherein said speech output module includes a personifier.

11. The communication system of claim 9, wherein said automatic speech recognizer module converts said speech signal into said text sequence based on a first algorithm.

12. The communication system of claim 11, further comprising a second automatic speech recognizer module, said second automatic speech recognizer module configured to convert said speech signal to a second text sequence based on a second algorithm.

13. The communication system of claim 12, further comprising a text sequence comparator module configured to compare said text sequence with said second text sequence.

14. The communication system of claim 13, wherein said text sequence comparator module generates an error corrected text sequence based on the comparison of said text sequence and said second text sequence.

15. The communication system of claim 9, wherein said translator module comprises a plurality of translator modules.

16. The communication system of claim 9, wherein said output speech module converts said translated text sequence into an output speech signal using a text-to-speech algorithm.

17. A speech morphing communication system comprising:

a speech input device configured to receive a speech signal of a speaker in a first language;

a first automatic speech recognizer and a second automatic speech recognizer coupled with said input device, said first automatic speech recognizer configured to convert said speech signal into a first text sequence in the first language and said second automatic speech recognizer configured to convert said speech signal into a second text sequence in the first language;

a text sequence comparator coupled with said first automatic speech recognizer and said second automatic speech recognizer, said text sequence comparator configured to select one text sequence from among said first text sequence and said second text sequence;

a speech analyzer coupled with said speech input device, said speech analyzer configured to extract all paralinguistic characteristics of the speech signal in the first language from said speech signal;

one or more translators coupled with said text analyzer, said one or more translators configured to translate said selected text sequence from the first language to one or more second languages to generate a translated text sequence in the one or more second languages; and a speech output device comprising a look-up table of paralinguistic characteristics mapping between the paralinguistic characteristics of the speech signal in the first language to paralinguistic characteristics of the speech signal in the one or more second languages, and said speech output device configured to transform all of the paralinguistic characteristics of the speech signal in the first language to the paralinguistic characteristics of the speech signal in the one or more second languages based on the mapping between the paralinguistic characteristics of the speech signal in the first language to the paralinguistic characteristics of the speech signal in the one or more second languages of the look-up table of paralinguistic characteristics and convert said translated text sequence into an output speech signal in the one or more second languages based on said paralinguistic characteristics of the speech signal in the one or more second languages, wherein the transformation of all the paralinguistic characteristics of the speech signal in the first language to the paralinguistic characteristics of the speech signal in the one or more second languages comprises transforming at least one paralinguistic characteristic of the speech signal in the first language imparting a connotation in the first language to a first word in the speech signal in the first language to at least one corresponding paralinguistic characteristic of the speech signal in the one or more second languages imparting the connotation in the one or more second languages to a second word of the speech signal in the one or more second languages, the second word in the one or more second languages being a translation of the first word in the first language, wherein said paralinguistic characteristics of the speech signal in the first language comprises at least one of a first pitch of the speech signal in the first language, a first amplitude of the speech signal in the first language, and a first rate of speech of the speech signal in the first language, and wherein said paralinguistic characteristics of the speech signal in the one or more second languages comprises at least one of a second pitch of the speech signal in the one or more second languages, a second amplitude of the speech signal in the one or more second languages, and a second rate of speech of the speech signal in the one or more second languages.

18. A method for converting speech into text comprising:
receiving an input speech signal of a speaker in a first language;
extracting all paralinguistic characteristics of the speech signal in the first language from said input speech signal;
converting said input speech signal to one or more text sequences in the first language;
transforming all of the paralinguistic characteristics of the speech signal in the first language to paralinguistic characteristics of the speech signal in a second language;
translating said text sequence from the first language to the second language; and
transforming said text sequence into an output speech signal in the second language based on said paralinguistic characteristics of the speech signal in the second language,
wherein the transforming of the paralinguistic characteristics comprises:
reading from a look-up table of paralinguistic characteristics mapping between the paralinguistic characteristics of the speech signal in the first language to paralinguistic characteristics of the speech signal in a second language; and
transforming at least one paralinguistic characteristic of the speech signal in the first language imparting a connotation in the first language to a first word in the speech signal in the first language to at least one corresponding paralinguistic characteristic of the speech signal in the second language imparting the connotation in the second language to a second word of the speech signal in the second language based on the mapping between the paralinguistic characteristics of the speech signal in the first language to the paralinguistic characteristics of the speech signal in the second language of the look-up table of paralinguistic characteristics, the second word in the second language being a translation of the first word in the first language,
wherein said paralinguistic characteristics of the speech signal in the first language comprises at least one of a first pitch of the speech signal in the first language, a first amplitude of the speech signal in the first language, and a first rate of speech of the speech signal in the first language, and
wherein said paralinguistic characteristics of the speech signal in the second language comprises at least one of a second pitch of the speech signal in the second language, a second amplitude of the speech signal in the second language, and a second rate of speech of the speech signal in the second language.

19. The method of claim 18, wherein said converting said input speech signal includes generating a plurality of text sequences and determining a score for each one of said plurality of text sequences.

* * * * *